April 21, 1936.  H. A. LOCKWOOD  2,037,807

BAKING PAN UNIT

Filed Feb. 11, 1935

Inventor
Harry A. Lockwood

By Murray and Gugelter
Attorneys

Patented Apr. 21, 1936

2,037,807

UNITED STATES PATENT OFFICE 2,037,807

BAKING PAN UNIT

Harry A. Lockwood, Cincinnati, Ohio, assignor to The Lockwood Manufacturing Co., Cincinnati, Ohio, a corporation of Ohio Application February 11, 1935, Serial No. 6,045

7 Claims. (Cl. 53—6)

This invention relates to a baking pan unit of the type commonly used in bakeries and a plurality of which units are usually stored in nested or stacked relationship.

An object of the invention is to provide a baking pan unit provided with novel means for effecting solid and efficient stacking or nesting of the units.

Another object is to provide a baking pan unit constructed with nesting means of the kind described which likewise serve to protect the top edges of stacked units from frictional wear, abrasion and distortion.

Another object is to provide means of the kind described adapted for efficient manufacture and long periods of useful service.

These and other objects are attained by the means described herein and illustrated in the accompanying drawing in which.

The storing of baking pan units in stacked relationship has heretofore involved various difficulties and disadvantages chief among which was the fact that looseness and play between the various units resulted upon stacking thereof so that it was impracticable to stack the units to any substantial height without having the units lose their aligned relationship and consequently topple out of place. This has been especially true when it was attempted to shift the stacks of pan units whereby a constant inconvenience and loss of time and effort was encountered. In addition to the foregoing, the shifting of pan units as commonly practiced has involved the frictional contact of the top portions of the nested end pans so that the metal edges became worn and distorted and the useful life of the pans thereby materially lessened.

These and other difficulties have been obviated by the means of the present invention which provides, in brief, for an engageable member and an engagement member provided at the extremities of a pan unit, the engageable member consisting preferably of a bead extending along the lateral outer edge of the end pans of the unit and projecting laterally beyond the top edges of the end pans beneath which they are disposed. The engagement member consists preferably of a resilient strip extending beneath said beads and projecting outwardly and directed downwardly of the end pans so that, when the units are nested, the engagement member contacts or binds against the beads of the unit below and assures firm stacking of the units. In addition the engagement members of one unit overlap the outermost top edges of the end pans of the unit beneath so that frictional wear distortion of these otherwise exposed edges are avoided.

Figure 1:
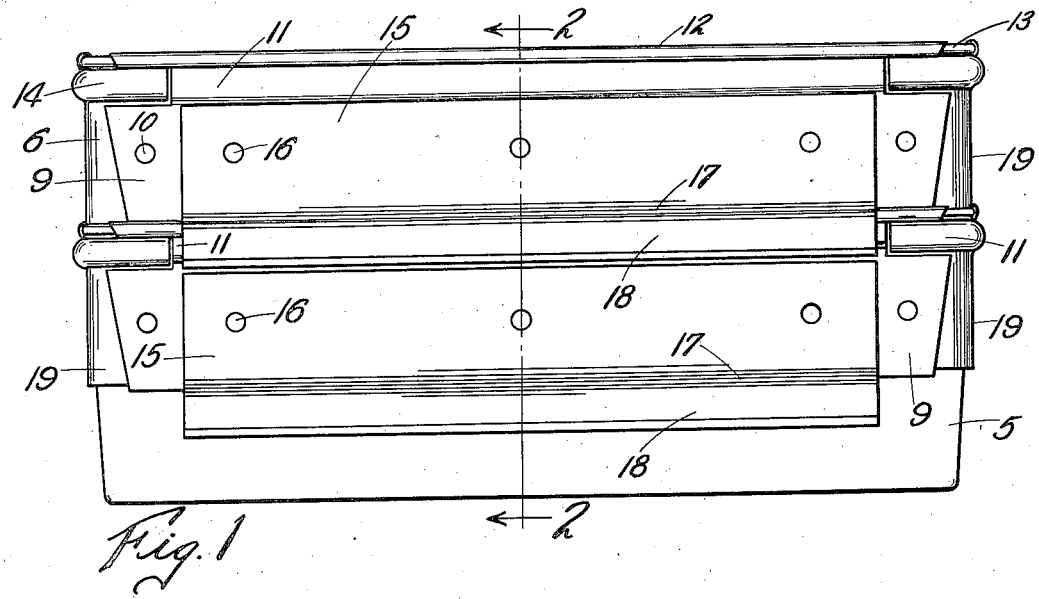
Fig. 1 is an end elevation of two baking pan units provided with the means of the present invention and shown in nested relationship.
Figure 2:
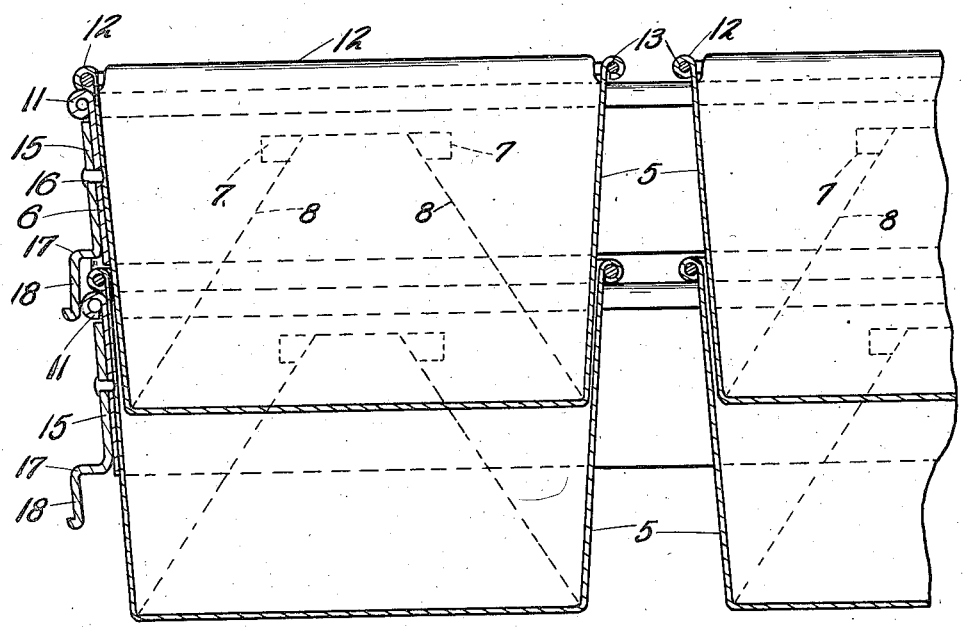
Fig. 2 is a cross sectional view with parts broken away taken on the line 2—2 of Fig. 1.

In greater detail and with reference to the drawings, the baking pan units contemplated in this invention may each comprise a selected number of substantially rectangular pans 5 connected in spaced substantially parallel relationship. The connecting means may comprise a metal strap 6 extending along the ends of the pans of the unit and connected thereto by suitable means, such as the commonly utilized lugs 7 (Fig. 2) which are struck inwardly from the strap 6 adjacent the end of each pan of the unit and inserted beneath the edges of the triangular end folds 8 commonly formed at the ends of pans of this kind. These lugs and end folds are firmly compressed to prevent their separation. At the corners of the unit, the straps 6 are turned for embracing the four corners of the unit as seen in Fig. 1 and the extreme turned ends of the straps 6 may be overlapped by the ends of similar but shorter sections of strap 9 fixed to the outer wall of the end pans of the units such as by rivets 10. The straps 6, where they are turned about the corners of the unit, may be formed to provide outwardly projecting vertical loop members 19 (Fig. 1) which serve effectively as bumpers protecting the corners of the units. It will be seen that both the elongated straps 6 and the shorter straps 9 are formed, in accordance with the present invention, to provide horizontally extending beads or abutment members 11 and 14 which may encircle the entire unit just beneath the top edges 12 of the unit. It may be observed here that said top edges of the pans may, in a well known manner, be rolled over a continuous wire 13 which extends around the upper periphery of each pan. The beads 11 provided at the ends of the unit serve as engageable members adapted to cooperate with engagement members to be later described. It is readily apparent in Fig. 2 that said engageable members 11 project laterally of the ends of the unit beyond the adjacent top edges 12 of the end pans. This relationship will be further referred to in connection with the engagement members.

The latter may each comprise a metal strip the upper portion 15 of which is secured such as by rivets 16 to the outer face of the end straps 9. The lower longitudinal portion of the strip 15 is bent outwardly and downwardly as at 17 to provide the engagement member 18 which is directed downwardly of the end pan with which it is associated and in spaced relationship therewith. By reference to Fig. 2, it will be seen that the engagement member 18, when it is out of engagement with a subjacent pan unit is normally disposed at a slightly inward or convergent angle substantially parallel with the slant wall of the pan. Furthermore, the engagement member is preferably of resilient metal to emphasize its gripping function.

When one unit of the present invention is nested into another similarly formed unit, the engagement members 18 frictionally bind against and embrace the laterally projecting beads 11 along the total length of the beads and the engagement member so that a firm resilient frictional hold of one unit upon the unit beneath is achieved. This frictional union of stacked sets of pans permits the sets to be built up to any desired height without danger of the stack losing its proper alignment and toppling over. The engagement members 18, as will likewise be observed in Fig. 2, overlap the top outer edges of the end pans of the subjacent unit so that when a stack of the units is shifted, forcible contacts with other units or objects which inevitably occur are precluded from distorting and wearing said end edges of the unit.

It is worthy of note that the engagement members 18 do not lose their function even after long periods of use have resulted in modification of their original shape or angle by repeated bumping or by reduction of their temper due to frequent heating and cooling of the pans. Even though said engagement members should, from causes such as mentioned, fail to make immediate contact with the bead members cooperating therewith, nevertheless any space resulting between the beads 11 and members 18, at the two ends of the unit, would necessarily be so slight that members 18 would still serve effectually as movement-limiting means for precluding intershifting of the pans of a stack and frictional wear of the bottom portions of one pan with the top portions of the one beneath.

Modifications become obvious upon consideration of the means herein disclosed but these are believed to be comprised within the spirit and scope of the present invention.

What is claimed is:

1. A baking pan unit comprising a plurality of connected pans, an abutment member attached to the periphery of the unit and projecting laterally beyond the top edge of the unit, and an engagement member attached to the unit adjacent said abutment member and having an engaging portion directed downwardly of the unit, the abutment member being adapted to be frictionally embraced by the engagement member of another similar unit when said units are nested whereby solid stacking of a plurality of the units may be achieved.

2. A baking pan unit comprising a plurality of pans connected in parallel relationship, an abutment member attached at each end of the unit and comprising a bead extending along the outer wall of the end pans of the unit and projecting laterally beyond the adjacent top edges of said pans, and an engagement member attached to the end pans of the unit adjacent said abutment members, said engagement members comprising each a resilient strip directed downwardly of the unit in spaced relationship with the adjacent wall of the end pan with which it is associated, said beads being adapted to be frictionally embraced by the engagement members of another similar unit when said units are nested whereby solid stacking of a plurality of the units may be achieved.

3. A baking pan unit comprising a plurality of pans in parallel relationship, a connecting strap extending around the unit adjacent the outer top edges of the unit, said strap at the ends of the unit being provided with a bead projecting outwardly beyond the adjacent top edges of the unit, and an engagement member attached one each to the end pans of the unit below said beads and each comprising a strip directed downwardly of the unit in spaced relationship with the adjacent pan wall, said beads being adapted to be frictionally embraced by the engagement members of another similar unit when said units are nested whereby solid stacking of a plurality of the units may be achieved.

4. A baking pan provided with a bead projecting laterally beyond the top edge of the pan, and an engagement member attached to the pan adjacent the bead and comprising a resilient strip directed downwardly of the pan in spaced relationship with the adjacent wall thereof, said bead being adapted to be frictionally embraced by the engagement member of another similarly constructed pan when the pans are nested whereby solid stacking of a plurality of the pans may be achieved.

5. A baking pan unit comprising a plurality of aligned connected pans, an abutment member attached to the periphery of the unit and extending laterally beyond the top edge of the unit, and an engagement member attached laterally to the unit and provided with a downwardly directed portion adapted, when the unit is nested into another similarly constructed unit, to enclose the abutment member of the lower unit in close adjacency therewith for precluding intershifting of the nested pans and frictional wear of their adjacently-disposed parts.

6. A baking pan unit comprising a plurality of connected pans, an engagement member attached laterally to the unit and comprising a downwardly directed portion disposed in spaced relation with the adjacent wall of the unit, and means at the top of the unit adapted to be embraced by the engagement member of another similar unit when the two units are nested together.

7. A baking pan provided with an engagement member attached to a wall of the pan exteriorly thereof and comprising a downwardly directed portion disposed in spaced relation with the adjacent wall of the pan, and means at the top of the pan adapted to be embraced by the engagement member of another similarly constructed pan when the two pans are nested together to provide for solid stacking of a plurality of the pans.

HARRY A. LOCKWOOD.